(12) United States Patent
Gielis

(10) Patent No.: US 7,486,169 B2
(45) Date of Patent: Feb. 3, 2009

(54) CONTROLLING AND/OR MONITORING DEVICE USING AT LEAST A TRANSMISSION CONTROLLER

(75) Inventor: Michel Gielis, Muralto (CH)

(73) Assignee: Inventio AG, Hergiswil (CH)

( * ) Notice: Subject to any disclaimer, the term of this patent is extended or adjusted under 35 U.S.C. 154(b) by 236 days.

(21) Appl. No.: 10/517,512

(22) PCT Filed: Jun. 12, 2003

(86) PCT No.: PCT/EP03/07131

§ 371 (c)(1),
(2), (4) Date: Dec. 10, 2004

(87) PCT Pub. No.: WO03/107107

PCT Pub. Date: Dec. 24, 2003

(65) Prior Publication Data

US 2006/0097842 A1    May 11, 2006

(30) Foreign Application Priority Data

Jun. 13, 2002 (FR) .................................. 02 07297

(51) Int. Cl.
  *G05B 23/02* (2006.01)
(52) U.S. Cl. ..................... 340/3.1; 340/3.43; 340/3.51
(58) Field of Classification Search .............. 340/3.1, 340/3.43, 3.51, 10.1, 572.1, 506, 505; 187/391
See application file for complete search history.

(56) References Cited

U.S. PATENT DOCUMENTS

| | | | |
|---|---|---|---|
| 3,707,708 A * | 12/1972 | Dan ........................... 340/503 |
| 4,086,519 A * | 4/1978 | Persson ....................... 318/254 |
| 4,532,509 A * | 7/1985 | Pulverenti et al. ........... 340/825 |
| 4,821,291 A | 4/1989 | Stevens et al. ................ 375/37 |
| 4,872,532 A * | 10/1989 | Tobita et al. ................. 187/391 |
| 4,879,756 A | 11/1989 | Stevens et al. ................ 455/39 |
| 4,937,586 A | 6/1990 | Stevens et al. .............. 343/702 |
| 5,028,918 A | 7/1991 | Giles et al. ............. 340/825.54 |
| 5,274,203 A * | 12/1993 | Skalski et al. ............... 187/393 |
| 5,532,465 A * | 7/1996 | Waterhouse et al. ........ 235/383 |
| 5,682,024 A * | 10/1997 | Koopman et al. ........... 187/394 |
| 6,163,270 A * | 12/2000 | Silverman ................... 340/3.3 |
| 6,204,760 B1* | 3/2001 | Brunius ....................... 340/529 |
| 6,732,839 B2* | 5/2004 | Schuster ...................... 187/391 |

FOREIGN PATENT DOCUMENTS

| | | |
|---|---|---|
| NZ | 501864 | 8/2002 |
| WO | WO 01/02211 A1 | 1/2001 |

* cited by examiner

*Primary Examiner*—Edwin C Holloway, III
(74) *Attorney, Agent, or Firm*—Wolff & Samson PC

(57) ABSTRACT

The invention concerns a controlling and/or monitoring device, comprising a plurality of peripherals (Pa, Pb, Pc, Pn), a central control unit (4) and a communication network (5) connecting the central unit (4) to the various peripherals (Pa, Pb, Pc, Pn). The central control unit (4) comprises one or two transmission controllers (41, 42) connected to the various peripherals through a transmission channel (50), each transmission controller (41, 42) comparing context codes (Ka, Kb, Kc, Kn) received from the peripherals with stored reference codes (Ra, Rb, Rc, Rn) to set a security circuit (6) in a security configuration or in a fault configuration, depending on whether or not the compared codes show identical one-to-one correspondence.

13 Claims, 2 Drawing Sheets

CONTROLLING AND/OR MONITORING DEVICE USING AT LEAST A TRANSMISSION CONTROLLER

PRIORITY CLAIM

This is a U.S. national stage of International Application No. PCT/EP2003/07131, filed on Jun. 12, 2003. Priority is claimed on that application and on the following application:
Country: France, Application No. 02/07297, Filed: Jun. 13, 2002.

BACKGROUND OF THE INVENTION

The invention relates, in general, to the field of information technologies and remote control or monitoring.

More precisely, the invention relates to a control and/or monitoring device, comprising a number of peripheral devices, a control central processing unit and a communication network linking the central processing unit to the various peripheral devices.

Even though many known devices match this definition, these devices generally use sophisticated addressing means, demanding performances from the communication network that may only be obtained at the cost of considerable complexity.

SUMMARY OF THE INVENTION

Based on this observation, the purpose of the invention is to propose a technique offering the same functional characteristics as the known devices, but using simple means that are commonly available today.

To this end, the device of the invention, which moreover complies with the generic definition provided by the above preamble, comprises an electrical security circuit, selectively adopting a security configuration or an anomaly configuration. Each peripheral device is at all times subject to a condition which affects it entirely or partially, that belongs to a number of possible conditions including a reference condition, and for which the peripheral device selectively reports in the form of a context code. The control central processing unit comprises at least a first transmission controller which has, for each peripheral device, a stored reference code formed by the context code transmitted by this peripheral device for its reference condition, which takes the context code of each of the peripheral devices by periodic polling of these peripheral devices according to a predetermined addressing order, which carries out comparisons of the context codes one by one that have been taken by polling of the peripheral devices and stored reference codes it stores, and which commands the passage of the security circuit from its security configuration to its anomaly configuration in response to the detection of the absence of one of the codes to be compared or a disparity between the codes compared by it.

In the preferred embodiment of the invention, each peripheral device is identified by an identification code that is specific to it and that this peripheral device sends to the control central processing unit, as a context code, in the situation where it is in its reference condition, and only in this situation.

It may be useful to provide for the control central processing unit to include a second transmission controller that also has, for each peripheral device, a stored reference code formed by the context code that this peripheral device provides for its reference condition. This second transmission controller, independently of the first transmission controller, carries out comparisons, one by one, of the context codes taken by polling of the peripheral devices and the reference codes stored by it, and commands the passage of the security circuit from its security configuration to its anomaly configuration in response to the detection of the absence of one of the codes to be compared or a disparity between the codes compared by it.

For example, each transmission controller comprises, in memory, a fixed table of reference codes stored during an installation phase of the device and a dynamic table registering the context codes taken by polling of the peripheral device. Each transmission controller is thus able to compare the respective contents of the fixed table and the dynamic table by periodically updating the contents of the dynamic table.

The peripheral devices are advantageously electrically powered by the control central processing unit via the communication network.

Furthermore, this network may be essentially composed of a wire bus connecting all of the peripheral devices to the central processing unit.

In its most accomplished form, the device of the invention maybe designed so that each peripheral device includes a pair of interactive organs including a master organ and a slave organ associated to one another. The communication network connects the central processing unit to the various control master organs. For each peripheral device, the condition represented by the context code is a condition affecting the slave organ or a relation between the slave organ and the master organ of this peripheral device. Furthermore, the master organ of each peripheral device electrically powers the slave organ of this peripheral device and constitutes an interface between this slave organ and the first transmission controller of the control central processing unit, the master organs being electrically powered for example by the first controller via the network.

In these conditions, the slave organ of each peripheral device may include an electronic label in which is stored the identification code of this peripheral device, the master organ of this same peripheral device then comprising a corresponding electronic label reader.

Each peripheral device may also comprise a state encoder producing a state signal that depends on the condition to which this peripheral device is subjected, and that is transmitted by the electronic label of this peripheral device to the corresponding master organ, or that is created directly by this master organ.

For example, it is possible to provide that the slave organ of each peripheral device is mobile with respect to the master organ of this peripheral device, that the state signal produced by the state encoder of this peripheral device is representative of a relative position of this organ with respect to this master organ, and that this relative position constitutes the condition to which this same peripheral device is subjected.

To this end, the state encoder may, for each peripheral device, comprise at least one permanent magnet carried by one of the interactive organs of this peripheral device, and a magnetic field sensor carried by the other interactive organ of this peripheral device.

In this case, it may be wise to provide that, for each peripheral device, the state encoder essentially includes a pair of permanently magnetized tracks distant from one another, carried by the slave organ of this peripheral device, and a corresponding pair of Hall effect sensors, carried by the corresponding master organ. The magnetized tracks are positioned opposite the corresponding Hall effect sensors for a reference relative position of the slave organ with respect to the master organ, that is unique and which constitutes the reference condition. The state signal takes at least two different logic values, depending on whether the slave organ is in its reference relative position with respect to the master organ or not.

BRIEF DESCRIPTION OF THE DRAWINGS

Other characteristics and advantages of the invention will become apparent from the following description, provided by way of example and in no way restrictive, in reference to the appended diagrams, in which.

DETAILED DESCRIPTION OF THE INVENTION

Figure 1:
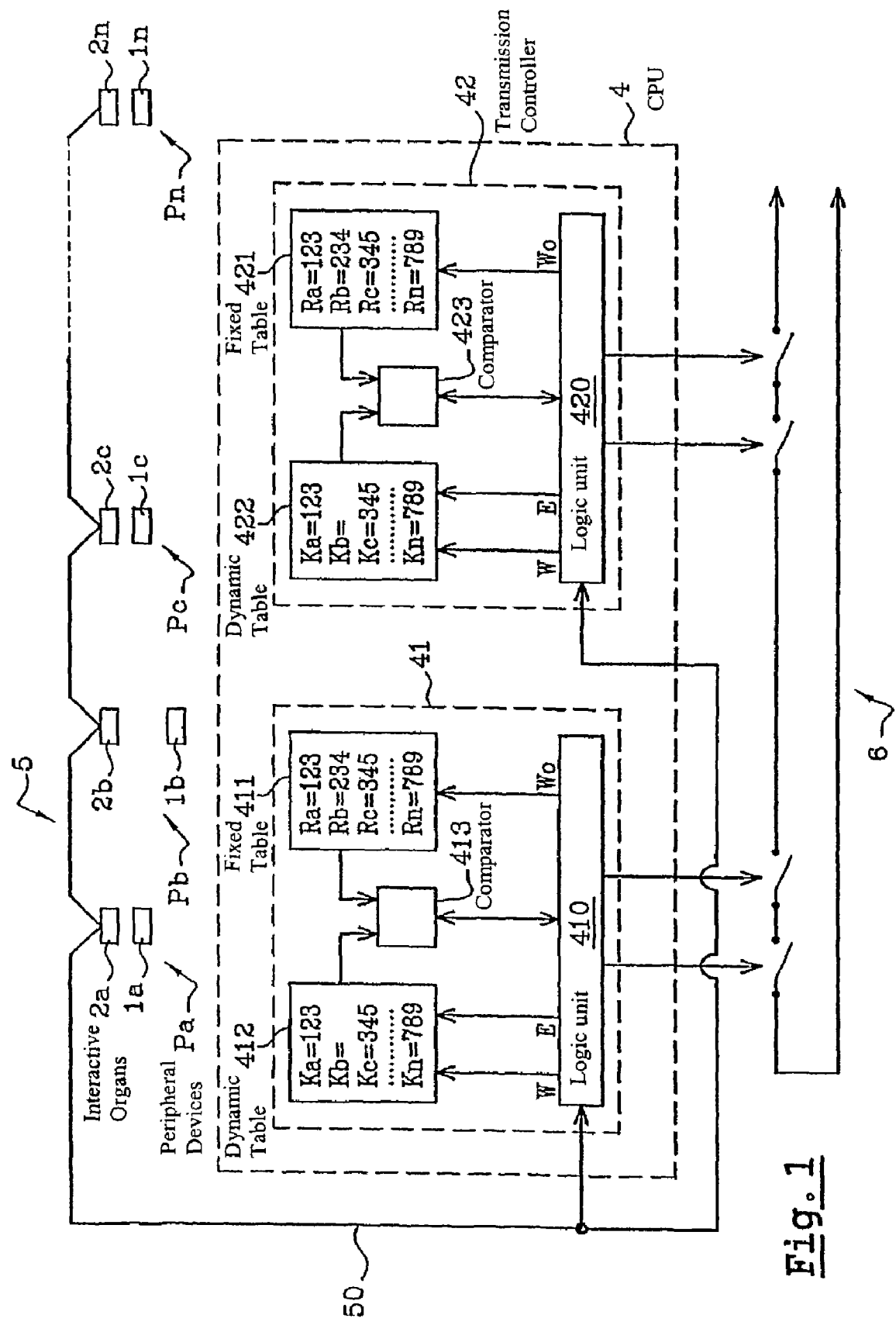
FIG. 1 is a general diagrammatic view illustrating a device which complies with the invention.
Figure 2:
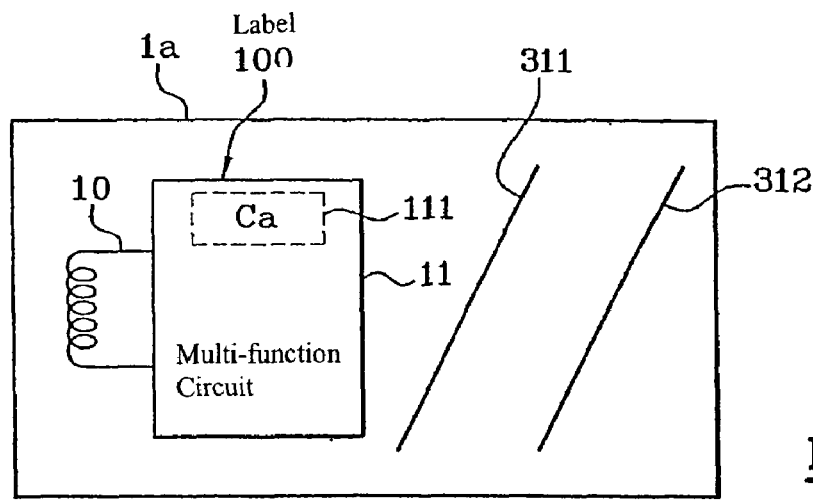
FIG. 2 is a diagrammatic view of a slave organ likely to be used in a device which complies with the invention and including in particular an electronic label.

As previously stated, the invention relates to a control and/or monitoring device, this device notably comprises a number of peripheral devices such as Pa, Pb, Pc and Pn, a control central processing unit 4, and a communication network 5 connecting the control central processing unit 4 to the various peripheral devices.

In the device of the invention, each of the peripheral devices Pa to Pn is at all times subject to a condition, which constitutes the purpose of the control or monitoring to be carried out.

To give a better idea, we can imagine for example that each peripheral device may be in a state representative of a normal operating condition, that will be taken as the reference condition, or in a state representative of an abnormal operating condition, that needs to be detected so that the appropriate corrective measures may be taken.

Each peripheral device takes account of the condition to which it is subjected in the form of a code noted Ka, Kb, Kc, or Kn, and that is called the "context code", given that it concerns each peripheral device considered in its local situation.

The device of the invention furthermore comprises an electrical security circuit 6, that is placed in a security configuration when all of the peripheral devices Pa to Pn are in their reference condition, or on the contrary are in an anomaly configuration if one or several of the peripheral devices is in a condition different to its reference condition.

For example, the security circuit 6 forms an electrically conductive closed loop in its security configuration, which is broken in its anomaly configuration.

To determine the configuration to be given to the security circuit 6, the communication network 5 comprises a transmission channel 50 connecting all of the peripheral devices Pa to Pn to the control central processing unit 4, which itself comprises a transmission controller 41, or preferably two transmission controllers 41 and 42.

Even though the transmission channel 50 can be formed by a radio channel, and even though, furthermore, the peripheral device Pa to Pn may be electrically powered in situ by a decentralized source, the hypothesis will be used hereunder that the transmission channel 50 is constituted by a wire bus through which, moreover, the peripheral devices are electrically powered, this layout corresponding to a particularly advantageous application of the invention.

Each of the transmission controllers 41 and 42 have, for each of the peripheral devices Pa to Pn, a stored reference code Ra to Rn, each stored reference code taking the same value as the context code supplied by the corresponding peripheral devices for its reference condition, the stored reference code Ra therefore taking the context code value Ka, the stored reference code Rb therefore taking the context code value Kb, etc.

The reference codes such as Ra, Rb, Rc, and Rn are stored for example during an installation phase of the device, in a fixed table 411 for the transmission controller 41, and in a fixed table 421 for the transmission controller 42.

Each of the transmission controllers 41 and 42 periodically polls each of the peripheral devices Pa to Pn, according to a predetermined addressing order, and takes the context code Ka to Kn of each peripheral devices thus polled.

For example, each transmission controller such as 41 and 42 comprises a corresponding interface logic unit, such as 410 and 420, a corresponding dynamic table, such as 412 and 422, and a corresponding comparator, such as 413 and 423.

When the device is installed, the logic unit 410 of the transmission controller 41 commands, by its write output Wo, the recording of the various reference codes Ra to Rn in the fixed table 411, the logic unit 420 of the transmission controller 42 doing the same for the fixed table 421.

The level of security of the device of the invention may be increased by providing that each of the reference codes Ra to Rn has an internal structure complying with a predetermined algorithm common to all of these reference codes, that each of the controllers 41 and 42 checks, during this installation phase, that the structure of each of these reference codes Ra to Rn complies with this predetermined algorithm, and that the installation phase can only be successfully completed if this is indeed the case.

In operation, the logic unit 410 of the transmission controller 41 receives from each peripheral device Pa to Pn, the corresponding context code Ka to Kn, and commands by its write output W, the recording of this code in the dynamic table 412.

The comparator 413 compares the context codes Ka to Kn in the dynamic table 412 one by one to the reference codes Ra to Rn contained in the fixed table 411 and informs the logic unit 410 of any correspondence fault between the codes compared, whether this fault is due to the absence of one or more of the codes to be compared, or a disparity between the codes compared.

In the same way, the logic unit 420 of the transmission controller 42 receives fro each peripheral device Pa to Pn the corresponding context code Ka to Kn, and commands via its write output W, the recording of this code in the dynamic table 422.

The comparator 423 compares the context codes Ka to Kn in the dynamic table 422 one by one to the reference codes Ra to Rn contained in the fixed table 421 and informs the logic unit 420 of any correspondence fault between the codes compared, whether this fault is due to the absence of one or more of the codes to be compared, or a disparity between the codes compared.

Periodically, the interface logic units 410 and 420 erase the contents of the respective dynamic tables 412 and 422, by commanding their erase outputs E.

As soon as the transmission controller 41 detects a correspondence fault between the codes compared, it commands the passage of the security circuit 6 from its security configuration to its anomaly configuration, this operation being carried out, in the diagrammatic illustration shown, by interrupting the security circuit 6.

The transmission controller 42 carries out the same operation, independently of the transmission controller 41.

Even though the context code Ka to Kn, that each peripheral device Pa to Pn provides to the control central processing unit 4, may simply represent the condition to which this peripheral device is subjected, it may be more useful to provide that this context code supplied by each peripheral device Pa to Pn is constituted by an identification code attributed to this peripheral device to identify it specifically, and that each peripheral device Pa to Pn only supplies its identification code to the central processing unit 4 if it is in its reference condition.

In this case, if we note Ca, Cb, Cc, and Cn the identification codes respectively attributed to the peripheral devices Pa, Pb, Pc, Pn, the context codes Ka, Kb, Kc and Kn are respectively constituted by these identification codes, Ca, Cb, Cc and Cn, when all of the peripheral devices are in their reference condition, the context code Kx of any peripheral device Px that is not in its reference condition being in return constituted by the absence of transmission of the corresponding identification code Cx.

This situation is symbolically illustrated in FIG. 1, in which the peripheral devices Pa to Pn are all in their reference condition, except for the peripheral device Pb.

FIGS. 2 to 4C illustrate more precisely, by means of a special example, specific means permitting the device to be used as previously described.

In this detailed embodiment, each peripheral device such as Pa to Pn comprises a pair of interactive organs, i.e. 1a and 2a for the peripheral device Pa, 1b and 2b for the peripheral device Pb, 1c and 2c for the peripheral device Pc, and 1n and 2n for the peripheral device Pn.

Each pair includes a master organ and a slave organ associated to one another, the peripheral device Pa thus comprising the master organ 2a and the slave organ 1a.

The transmission channel 50, in this case formed by a wire bus, connects the central processing unit 4 to the various master organs such as 2a to 2n, these master organs being electrically powered via this bus 50 by the transmission controller 41.

The master organ of each peripheral device, for example the organ 2a of the peripheral device Pa, in turn electrically powers the corresponding slave organ, in this case the organ 1a, and forms a dialogue interface between this slave organ 1a and the transmission controller 41 of the control central processing unit 4.

Figure 3:
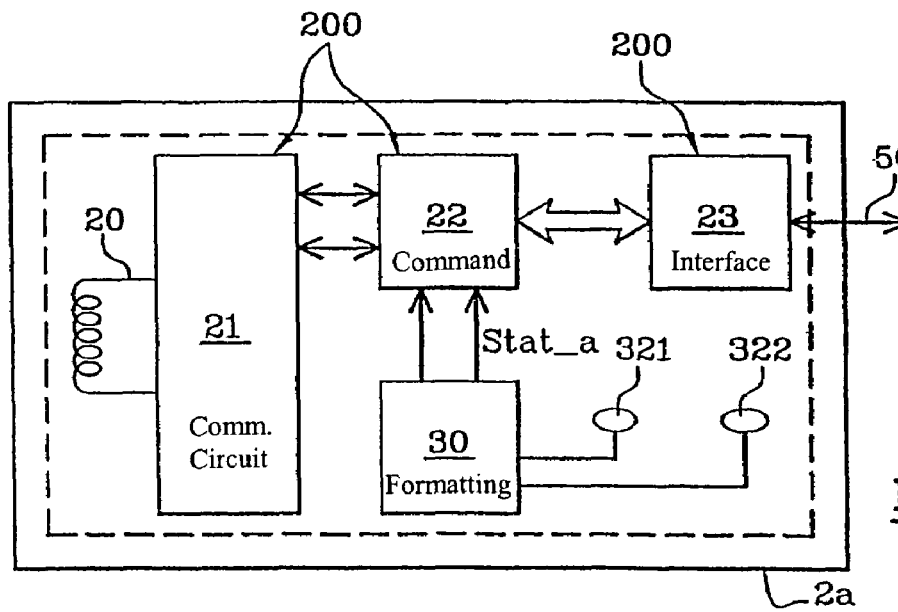
FIG. 3 is a diagrammatic view of a master organ likely to be used in a device which complies with the invention and including in particular an electronic label.

In this preferred embodiment of the invention, each slave organ such as 1a comprises an electronic label 100 (FIG. 2) in which the identification code Ca of the corresponding peripheral device Pa is stored, and the master organ 2a comprises a corresponding electronic label reader 200 (FIG. 3).

In a known method, the label 100 and its reader 200 are in mutual communication via respective radio antennae, such as 10 and 20, the reader electrically powering the label electromagnetically via these antennae.

Apart from its antenna 10, the label 100 essentially comprises a multi-function circuit 11 that is connected to the antenna 10 and which carries out the filtering and local distribution of the electrical energy received on the antenna 10, the communication with the reader 200 and more generally the management of the local computer resources that this label disposes of.

The multi-function circuit 11 is equipped with a memory 111 in which the identification code Ca of the corresponding peripheral device Pa is stored, which is conditionally transferred to the label reader 200.

On the other hand, the reader 200 comprises, in addition to its antenna 20, a communication circuit 21, a command circuit 22 and a network interface circuit 23.

The communication circuit 21 that is connected to the antenna 20, has the responsibility of transferring the energy to the antenna 20 and transferring the data to or from this antenna.

The communication circuit 21 is piloted by the command circuit 22, which can itself dialogue with the network interface circuit 23.

The network interface circuit 23 receives the electrical energy transported on the bus 50, and the dialogue with the central processing unit 4 via the bus 50.

Each peripheral device such as Pa comprises moreover a state encoder 3, for example formed by a power supply and formatting circuit 30 carried by the master organ 2a, and various other components such as 311, 312, 321 and 322, that will be described later.

The function of this state transducer 3, which at least partially belongs to the label 100, is to produce a state signal that is noted Stat-a for the peripheral device Pa, that depends on the condition to which this peripheral device is subjected, and that is transmitted by the electronic label 100 of this peripheral device to the corresponding master organ 2a, or that is directly created by this master organ 2a.

More precisely, the Stat-a signal reflects, for the peripheral device Pa, a condition affecting the slave organ 1a or a relationship between the slave organ 1a and the master organ 2a of this peripheral device, this condition being precisely that to which the supply of the identification code Ca as the context code Ka is subordinate.

Figures 4A, 4B, 4C:
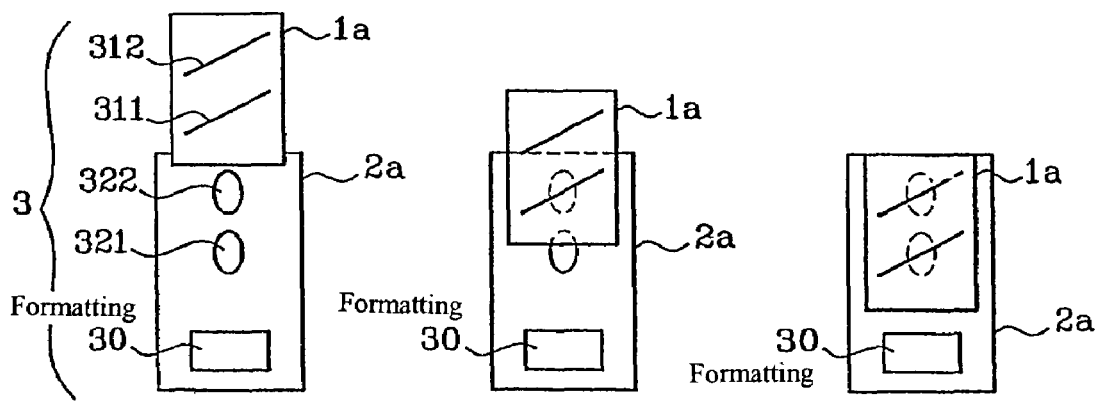
FIG. 4A is a diagrammatic view showing a master organ and a slave organ belonging to a device which complies with the invention, and located in a relatively distant position.
FIG. 4B is a similar view to that of 4A, in which the master organ and the slave organ are in an intermediate relative position.
FIG. 4C is a view similar to views 4A and 4B, in which the master organ and the slave organ are in their reference relative position.

In the case of the state signal such as Stat-a concerning a relationship between the label 100 and the reader 200, this relation may be constituted by a relative position of these two organs, as illustrated by the FIGS. 4A to 4C.

In this case, the slave organ 1a is mobile with respect to the master organ 2a, and the state signal Stat-a is then representative of the relative position adopted at each moment by these two organs.

For example, the state encoder comprises one or several permanent magnets, such as 311 and 312, carried by one of the organs of the first pair P of interactive organs, in this case by the slave organ 1a, and one or several magnetic field sensors such as 321 and 322, carried by the other organ of this first pair P of interactive organs, in this case by the master organ 2a.

FIGS. 2 to 4C illustrate an embodiment in which the state encoder 3 comprises two magnetized tracks 311 and 312, permanently magnetized, distant from one another and carried by the slave organ la, and two corresponding Hall effect sensors 321 and 322, carried by the master organ 2a.

The magnetized tracks 311 and 312 are positioned opposite the corresponding Hall effect sensors 321 and 322 for the unique relative position of the organs 1a and 2a as shown in FIG. 4C, this relative position being used as a reference and thus constituting the reference condition.

The Hall effect sensors 321 and 322 are connected to the electrical power and formatting circuit 30 which produces the state signal Stat-a and which supplies it to the control circuit 22, this signal taking at least two different main logic values, depending on whether the slave organ 1a is in its reference relative position with respect to the master organ 2a or not.

In other words, regardless of the number of bits used to encode the state signal Stat-a, the representative code of this signal starts by a bit whose high order position is equal to "1" or "0" (or the opposite), depending on whether the slave organ 1a is in its reference relative position with respect to the master organ 2a or not.

FIG. 4A shows the slave organ 1a in a position distant from the master organ 2a, which is to say in a position in which none of the Hall effect sensors 321 and 322 can detect one of the magnetized tracks 311 and 312, and in which the antennae 10 and 20 are too far offset with respect to one another to allow communication between the reader 200 and the label 100.

FIG. 4B shows the slave organ 1a in an "intermediate" position with respect to the master organ 2a, which is to say in a position in which only one of the Hall effect sensors 321 and 322 detects one of the magnetized tracks 311 and 312, the antennae 10 and 20 moreover being possibly too far offset with respect to one another to allow communication between the reader 200 and the label 100.

Finally, FIG. 4C shows the slave organ 1a in its reference position with respect to the master organ 2a, which is to say in a position in which each of the Hall effect sensors 321 and 322 detects the corresponding magnetized tracks 311 and 312, and in which the antennae 10 and 20 allow communication between the reader 200 and the label 100.

For the relative positions illustrated in FIGS. 4A and 4B, the Stat-a signal takes a value such that the identification code Ca is not transmitted to the central processing unit 4, this code being transmitted in return as a context code Ka for the reference relative position illustrated in FIG. 4C.

The invention claimed is:

1. A control and/or monitoring device, comprising:
a number of peripheral devices;
a control central processing unit;
a communication network connecting the control central processing unit to the various peripheral devices; and
an independent, second electrical security circuit selectively adopting a security configuration or an anomaly configuration, the security circuit being separate from the communication network, the security circuit forms a dedicated electrically conductive closed loop in the security configuration, which is broken in the anomaly configuration, each peripheral device at all times being subject to a condition which affects it at least partially, that belongs to a number of possible conditions including a reference condition that corresponds to a normal operating condition, and for which the peripheral device selectively reports as a context code, the control central processing unit includes at least a first transmission controller which has, for each peripheral device, a stored reference code formed by the context code transmitted by the peripheral device for its reference condition, which takes the context code of each of the peripheral devices by periodic polling of the peripheral devices according to a predetermined addressing order, which carries out comparisons of the context codes one by one that have been taken by polling of the peripheral devices and stored reference codes stored in the transmission controller, and which commands the passage of the security circuit from the security configuration to the anomaly configuration in response to a detection of an absence of one of the codes to be compared or a disparity between the codes compared.

2. The control and/or monitoring device of claim 1, wherein each peripheral device is identified by an identification code that is specific to the peripheral device, the peripheral device being operative to send the identification code to the control central processing unit, as a context code, in a situation where the peripheral device is in its reference condition, and only in this situation.

3. The control and/or monitoring device of claim 1, wherein the control central processing unit includes a second transmission controller that also has, for each peripheral device, a stored reference code formed by the context code that each peripheral device provides for its reference condition, the second transmission controller, independently of the first transmission controller, carries out comparisons, one by one, of the context codes taken by polling of the peripheral devices and the reference codes stored by the second transmission controller, and commands passage of the security circuit from the security configuration to the anomaly configuration in response to the detection of the absence of one of the codes to be compared or a disparity between the codes compared.

4. The control and/or monitoring device of claim 3, wherein each of the transmission controllers comprises, in memory, a fixed table of reference codes stored during an installation phase of the device and a dynamic table registering the context codes taken by polling of the peripheral devices, each of the transmission controllers being operative to compare the respective contents of the fixed table and the dynamic table by periodically updating the contents of the dynamic table.

5. The control and/or monitoring device of claim 1, wherein the peripheral devices are electrically powered by the control central processing unit via the communication network.

6. The control and/or monitoring device of claim 1, wherein the communication network comprises a wire bus that connects all of the peripheral devices to the central processing unit.

7. The control and/or monitoring device of claim 1, wherein each peripheral device includes a pair of interactive organs including a master organ and a slave organ associated to one another, the communication network being arranged to connect the central processing unit to the control master organs, for each peripheral device, the condition represented by the context code being a condition affecting the slave organ or a relationship between the slave organ and the master organ of the peripheral device, the master organ of each peripheral device being operative to electrically power the slave organ of the peripheral device and constitutes an interface between the slave organ and the first transmission controller of the control central processing unit.

8. The control and/or monitoring device of claim 7, wherein the peripheral devices are electrically powered by the control central processing unit via the communication network, the master organs being electrically powered by the first controller via the communication network.

9. The control and/or monitoring device of claim 7, wherein each peripheral device is identified by an identification code that is specific to the peripheral device, the peripheral device being operative to send the identification code to the control central processing unit, as a context code, in a situation where the peripheral device is in its reference condition, and only in this situation, the slave organ of each peripheral device including an electronic label in which the identification code of the peripheral device is stored, the master organ of this same peripheral device comprising a correspondence electronic label reader.

10. The control and/or monitoring device of claim 9, wherein each peripheral device also comprises a state encoder producing a state signal that depends on the condition to which the peripheral device is subjected, and that is transmitted by the electronic label of the peripheral device to the corresponding master organ, or that is created directly by the master organ.

11. The control and/or monitoring device of claim 10, wherein the slave organ of each peripheral device is mobile with respect to the master organ of the peripheral device, the state signal produced by the state encoder of the peripheral device being representative of a relative position of the slave organ with respect to the master organ, the relative position constituting the condition to which the peripheral device is subjected.

12. The control and/or monitoring device of claim 10, wherein, for each peripheral device, the state encoder comprises at least one permanent magnet carried by one of the interactive organs of the peripheral device, and a magnetic field sensor carried by the other interactive organ of the peripheral device.

13. The control and/or monitoring device of claim 12, wherein, for each peripheral device, the state encoder essentially includes a pair of permanently magnetized tracks distant from one another carried by the slave organ of the peripheral device, and a corresponding pair of Hall effect sensors carried by the corresponding master organ, the magnetized tracks being positioned opposite the corresponding Hall effect sensors for a reference relative position of the slave organ with respect to the master organ, that is unique and which constitutes the reference condition, the state signal taking at least two different logic values, depending on whether the slave organ is in its reference relative position with respect to the master organ or not.

* * * * *